United States Patent [19]
Dodd et al.

[11] 3,772,643
[45] Nov. 13, 1973

[54] TILT-ACTUATED SAFETY DEVICE
[75] Inventors: Everett A. Dodd, Laurance J. Horan, both of St. Louis, Mo.
[73] Assignee: said Horan, by said Dodd
[22] Filed: Mar. 6, 1972
[21] Appl. No.: 231,995

[52] U.S. Cl............. 340/52 H, 180/104, 200/61.52
[51] Int. Cl. .......................................... G08b 21/00
[58] Field of Search..................... 340/52 H, 54, 57, 340/267 C, 53; 200/51.09, 51.12, 61.45 R, 61.52, 61.83 T; 337/5, 12, 13, 126, 127, 88; 180/104

[56] References Cited
UNITED STATES PATENTS
1,857,172  5/1932  Wagner........................... 340/267 C
2,562,567  7/1951  Moledzky ......................... 340/52 H
3,218,416  11/1965  DeFalco............................. 337/127

Primary Examiner—Thomas B. Habecker
Assistant Examiner—Joseph E. Nowicki
Attorney—Ralph W. Kalish

[57] ABSTRACT

A tilt-actuated safety device for use with vehicles or other equipment subject to tilting or canting during operation comprising a main switch closeable when the vehicle or the like attains a predetermined degree of tilt, a first relay connected to said master switch and subject to a limited time delay closing for opening the vehicle or the like ignition system, and a second relay connected to said master switch and subject to a relatively increased time delay for permitting reenergization of said vehicle ignition system during such delay.

10 Claims, 5 Drawing Figures

TILT-ACTUATED SAFETY DEVICE

BACKGROUND AND SUMMARY OF THE INVENTION

This invention relates in general to tilt control devices of the type designed to automatically provide a warning signal, whether visual or aural, and to open a control circuit to the particular equipment for discontinuing operation of the same when the latter has attained a predetermined angle of tilt.

It is an object of the present invention to provide a compact, tilt-actuated safety device for disposition upon vehicles and other motor driven equipment, which during operation, may be subjected to canting or tilting to a hazardous degree; which device is designed to automatically effect cessation of motor operation upon attainment of a predetermined tilt angle.

It is another object of the present invention to provide a device of the character stated which is substantially self-contained and is adapted for installation upon existing vehicles or other equipment without requiring costly modification thereof; and being adaptable for facile connection to the power and ignition systems of the equipment being guarded.

It is another object of the present invention to provide a device of the character stated which uniquely incorporates a time delay mechanism so that accidental or momentary vehicle tilting will not activate the system; thereby requiring an interval of predetermined, yet safe, duration at the predetermined angle before deenergizing the associated motor or the like; thereby avoiding inadvertent cutting out of the motors at frequent unnecessary junctures.

It is a still further object of the present invention to provide a device of the character stated which embodies means for controlling the interval within which an operator may attempt to reinstitute motor operation, failing such the motor will be subject to shutting down so that recovery of the equipment from a potentially dangerous canted position will not inadvertently subject the equipment to additional peril.

It is another object of the present invention to provide a device of the character stated which is easily designed for operating at any predetermined angle of tilt in any and all directions so that the same has universal application upon the equipment in question.

It is a further object of the present invention to provide a device of the character stated which is comprised of a marked simplicity of components; which is subject to high volume low cost production; and which is durable and reliable in usage.

DESCRIPTION OF THE PREFERRED EMBODIMENT

Figure 1:
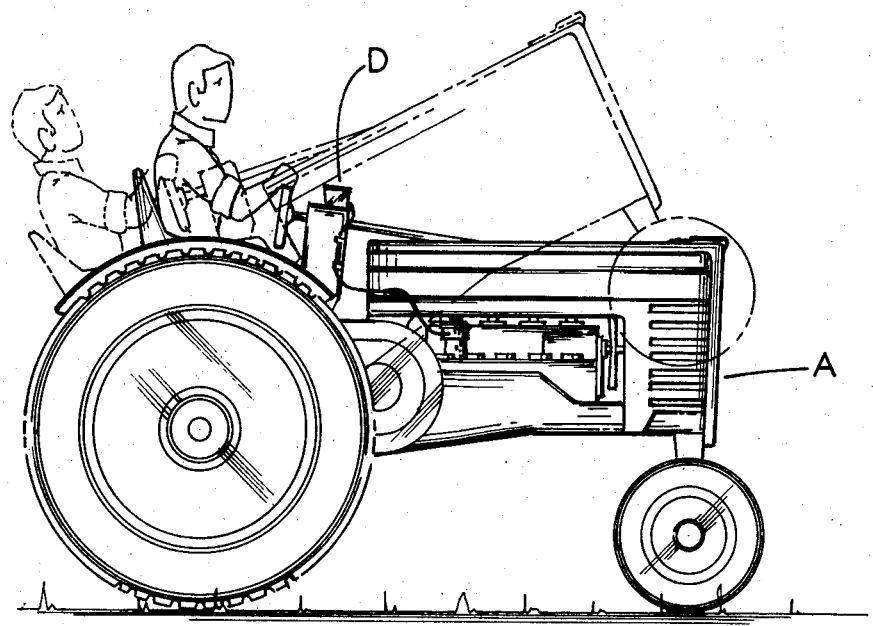
FIG. 1 is a side view of a vehicle having mounted thereon a tilt-actuated safety device constructed in accordance with and embodying the present invention.

Referring now by reference characters to the drawings which illustrate the preferred embodiment of the present invention, A generally designates a vehicle, which in the present instance, is depicted as a conventional farm tractor, but which may be of any other character. Installed upon vehicle A is a tilt-actuated safety device D, having a casing 1, comprising a base plate 2, an upstanding front wall 3, and a removable cover 4 having a top wall 5, side walls 6,6', and rearward end wall 7, which cooperate with front wall 3 and base plate 2 to define a fully enclosed compartment 8; there being screws or other attaching means for securing cover 4 in enclosing position and permitting ready removal thereof for access to the interior of compartment 8.

Mounted upon the central portion of base plate 2 is a relatively narrow panel 9 fabricated of suitable dielectric material and being disposed in planarwise parallel, elevated relationship to base plate 2 by virtue of screws 10 having spacers 11 surrounding their stem portions between base plate 2 and panel 9. Said panel 9 is provided with an enlarged opening 12 of generally ovate configuration having its major axis extending lengthwise, or front to back, of panel 9. Disposed upon the upper surface of panel 9 is an oval-shaped plate conductor 13 being fabricated of suitable metal and having an enlarged opening 14 for registration with panel opening 12, but of slightly reduced dimension so that the inner edge portions of said conductor opening 14 will extend inwardly of the proximate edges of panel opening 12 to assure of positive circuit-closing contact with a freely suspended pendulum 15 also fabricated of conductive material, such as copper and the like. Conductor 13 is rigidly maintained against undesired shifting relative to panel opening 12 by means of a rivet 16.

Said pendulum 15 carries at its upper end a relatively enlarged eyelet 17 for relative passage therethrough of a beam or arm 18 formed at the upper end of a post 19, fixed at its lower end upon panel 9, as by a rivet 20. Post 19 and its connected arm 18 are also formed of electrically conductive material being preferably the same as that of which pendulum 15 is fabricated. It will thus be seen that the cross section of arm 18 is considerably less than the inside diameter of eyelet 17 so that pendulum 15 is freely suspended therefrom so as to be swingable in all directions. Said arm 18 is downwardly bent, as at 21, in the support zone for pendulum 15 so as to normally present pendulum 15 in appropriate relationship to conductor 13 as well as to prevent displacement of the former therefrom during use. Post 19 is so located as to present arm 18 in upwardly spaced axially parallel relation to the major axis of opening 14 and with the zone of suspension for pendulum being located upwardly of the center point of opening 14 so that pendulum 15 will normally extend through said center point, spacedly from the edges of said opening 14. Pendulum 15 is also of such length that at its lower end it will extend downwardly through opening 14, terminating immediately above base plate 2. Thus, pendulum 15 is of such length that it is capable of contacting any point on the edge or margin of conductor 13 surrounding opening 14.

Accordingly, it will be seen that since pendulum 15 will hang vertically through gravity, the same will be out of contact with conductor 13 as long as base plate 2, and hence device D, does not form an angle with the horizontal of sufficient extent to cause an edge portion of conductor opening 14 to be brought relatively into contact with pendulum 15. Therefore, device D must be mounted upon vehicle A so that in a position of rest plate 2 is planarwise parallel with the horizontal.

By reason of the configuration of opening 14, it will be seen that pendulum 15 and conductor 13 will be brought into contact through an adequate tilting of vehicle A in any direction. However, by reason of the relatively greater longitudinal axis of said opening 14, vehicle A may assume a somewhat greater angle to the horizontal through its longitudinal axis than through its transverse axis before such contact is made. With the present contour of opening 14, pendulum 15 and conductor 13 will engage more readily upon the assumption of a lateral tilt by the vehicle A, such as when going alongside an incline, rather than going directly upwardly or downwardly of same. Accordingly, it must be recognized that conductor 14 may have any design commensurate with the particular application so as to allow of abutment by pendulum 15 upon the attainment of any predetermined angle of tilt or cant of vehicle A. It may be observed that pendulum 15 and conductor 13 constitute what may be considered a master switch for the system now to be described.

Figure 2:
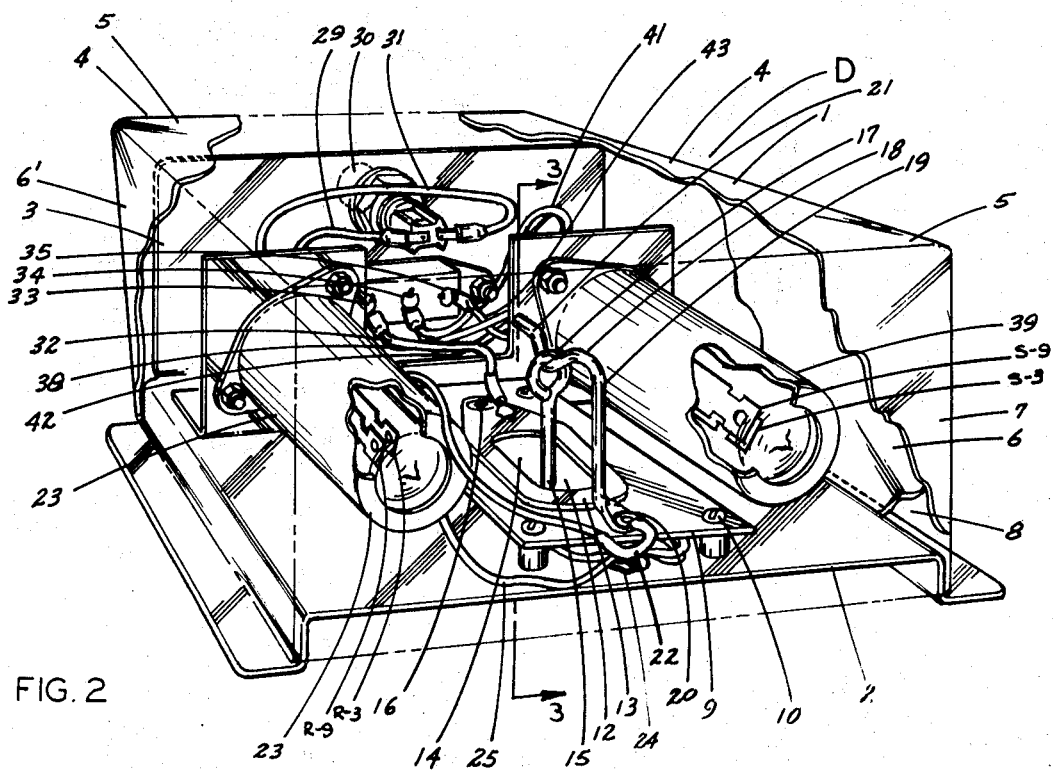
FIG. 2 is a perspective view of the device in horizontal, open condition, the casing cover being removed.
Figures 3, 4:
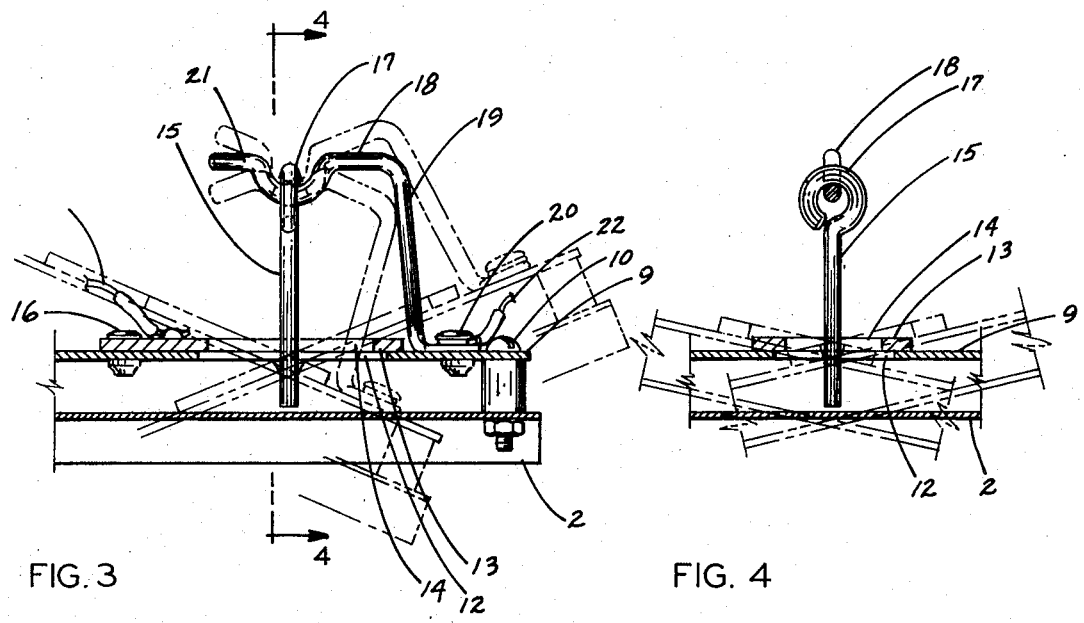
FIG. 3 is a vertical sectional view taken on the line 3—3 of FIG. 2.
FIG. 4 is a vertical transverse sectional view taken on the line 4—4 of FIG. 3.
Figure 5:
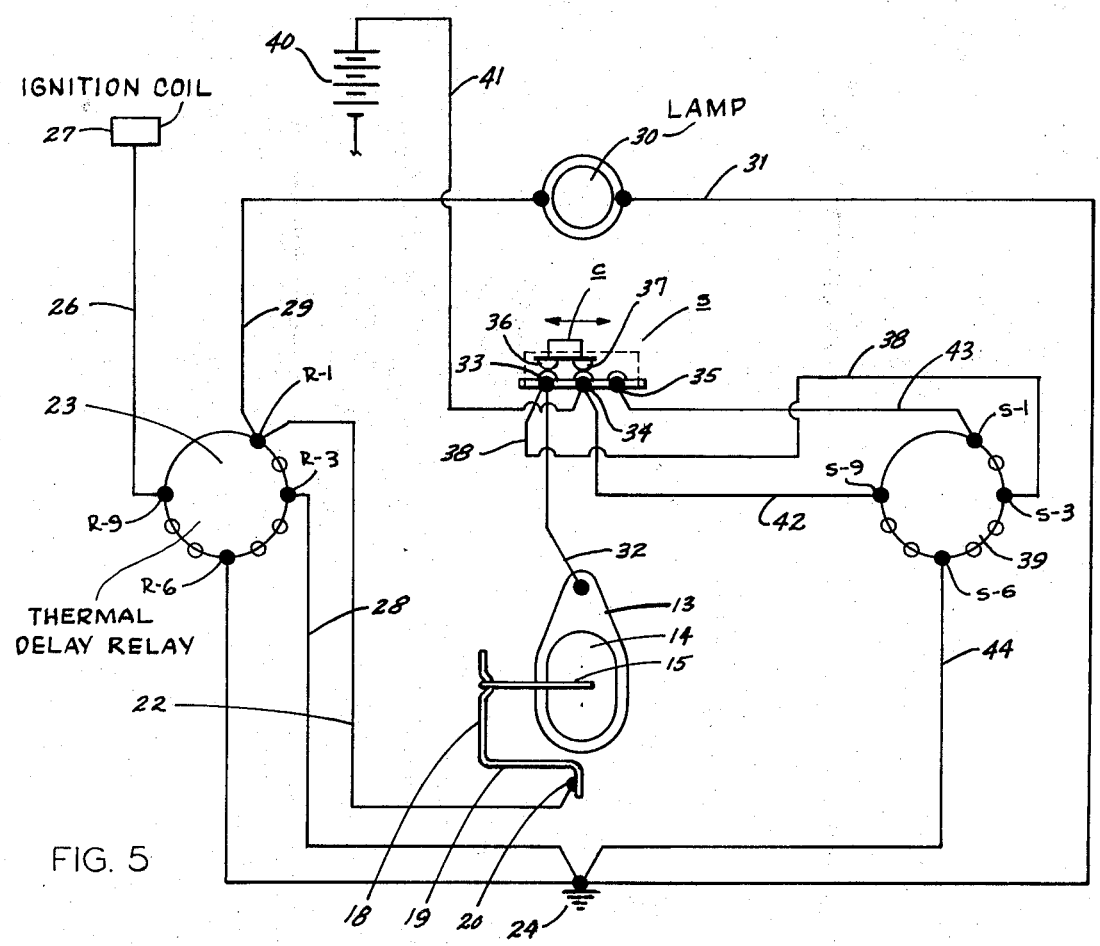
FIG. 5 is a wiring diagram.

Turning now to FIGS. 2 and 5, it will be seen post 19 is connected by a lead 22 to contact R–1 of a relay 23, being of the thermal type and having a heater coil (not shown), contact R–1 is connected to one side of the latter; the opposite side of which is connected through contact R–6 to ground, as at 24, by a lead 25. Relay 23 also embodies aligned contacts R–3 and R–9, which upon heating of the relay coil to the predetermined extent, are brought into circuit closing condition, as through differential rates of expansion, in accordance with common practice. Contact R–9 is in circuit by a conductor 26 with the ignition circuit, as through the ignition coil, indicated at 27, of the wiring system of vehicle A, while contact R–3 is engaged to ground, as by a lead 28. It is understood that the grounding of contacts R–3 and R–6 may be at any suitable point, such as upon the frame of vehicle A. Relay 23 is of such predetermined type that an interval of but two seconds is required to sufficiently energize its coil for closing contacts R–3 and R–9 whereby the circuit closed therethrough causes a shorting of the vehicle ignition system resulting in the same being cut out. Thereupon vehicle A is stopped. Contact R–1 of relay 23 is connected by a conductor 29 to a lamp 30, the opposite side of which is also grounded as through a lead 31. Thus, with current flowing to contact R–1, lamp 30 will be illuminated for purposes more fully set forth hereinbelow.

Conductor 13 is connected by a lead 32 to a post 33 of a three-post, two-position switch s having a center post 34 and end post 35, as well as embodying a slideable controller c, having a first and a second conductively interengaged contacts 36,37 for selectively engaging posts 33,34, respectively, in one of its positions, and posts 34,35, respectively, in its other position. Post 33 is also in circuit by means of a lead 38 with a contact S–3 of a relay 39, also of the thermal type, and incorporating the usual heater coil (not shown) which is adapted, in this instance, for energization upon elapsing of an interval of one-hundred twenty seconds, or two minutes. Post 34 of switch s is connected to one side of a battery 40 of vehicle A through a conductive member 41 and is also in circuit with a contact S–9, said center post 34 is also connected to contact S–9 of relay 39 by lead 42. Thus, contacts S–3, S–9 of relay 39, just as contacts R–3, R–9 of relay 23, are normally open. The remaining post 35 of switch s is engaged to contact S–1 of relay 39 by means of a conductor 43; said contact S–1 being engaged to one side of the heater coil of relay 39, while the opposite side is correspondingly connected to a contact S–6, which latter is grounded, through a conductive member 44.

In operation with device D affixed upon vehicle A and in level starting position with pendulum 15 projecting into opening 14, but spaced from the margins of opening 14 thereof, and with switch s in the position as shown in FIG. 5 wherein posts 33, 34 are operatively connected by controller c, the operator will then commence to drive vehicle A over the indicated terrain. Should vehicle A during its travel attain an angle of tilt so that pendulum 15 is brought into contact with a marginal portion of conductor opening 14, the circuit from vehicle battery 40 will thus be closed through conductor 13, pendulum 15, post 19, lead 22 to contact R–1 of relay 23. If pendulum 15 retains contact with conductor 13 for an interval of two seconds, the heater coil of relay 23 will have been energized to cause closure of contacts R–3, R–9, whereupon the ignition system of vehicle A will be opened and vehicle A stopped. It will be noted that upon current being brought to contact R–1, lamp 30 will be instantaneously illuminated and will remain in such condition as long as pendulum 15 is in circuit-making relationship to conductor 13.

By the foregoing, it will be noted that relay 23 is operative only as long as pendulum 15 and conductor 13 are in engagement for two seconds. If the contact between the same is for a lesser duration, such as through incidental rocking of vehicle A, striking a bump in its path, etc., relay 23 will not be energized and the vehicle motor not stopped. Thus, the requisite time delay for operation of relay 23 substantially assures that vehicle A has reached a precarious angle of tilt as distinguished from the mere momentary disposition. By complete stoppage of vehicle A, the operator is thereby assured against further movement of the same into a further position of hazard, and by such cessation of movement is then fully alerted to the need to take such counteraction as may be required.

With the vehicle motor stopped, the operator will then shift switch control c to its second position, opening the circuit between posts 33, 34 and closing same through posts 34,35. By such action, the circuit is opened to relay 23 to permit the heater coil of relay 23 to cool sufficiently to permit contacts R–3, R–9 to move away from each other into their normally opened condition and thus restore the vehicle ignition system to condition for operation. With switch s in said second position, current will flow from battery 40 through post 34, control c, post 35, conductor 43, to contact S–1 for energizing the heater coil of relay 39. As stated above, said coil is adapted for effecting closure of contacts S–3, S–9 after a 120 second interval. During the two minute interval for energizing relay 39 the operator may attempt, during the balance of said period subsequent to openings of contacts R–3, R–9, to restart vehicle A and attempt to remove same from its perilous angle of tilt. If such removal has not been achieved in that particular time interval, current will be restored to conductor 13 through lead 38, post 33, and lead 32 so the current will once again be brought to relay 23 for ultimate shorting of the ignition system and thereby turning same off.

The user must then return controller c to initial position, causing retention of vehicle ignition system in inoperative state for a period sufficient to allow heater coil of relay 39 to cool. Thereupon, controller c may be returned to its other position to reinstitute the substantially two minute interval (120 seconds) within which restarting of vehicle A may be achieved. Thus, such alternating efforts may be accomplished until the operator has been successful in removing vehicle A from a dangerous tilted condition.

It will be recognized from the foregoing that the two second and 120 second delays accorded by relays 23, 39 are fundamentally a matter of choice since relays could, admittedly, be adapted for any preselected time juncture. However, it has been found that the relative relays ascribed in connection with the foregoing have proved most efficacious in usage.

It is also quite apparent that by virtue of the configuration of opening 14 and by the dimensional relationship of the same with pendulum 15, device D can be caused to operate when vehicle A achieves any predetermined angle of tilt in any direction. It is quite obvious that device D is designed to stop the vehicle engine immediately prior to the said vehicle reaching a degree of angularity with respect to the horizontal which would cause over turning.

Device D is extremely compact and self-contained and may be easily installed on any vehicle much less any other device subject to tilting without costly modification of such vehicle or device and being connected to the electrical systems of such vehicle or devices in a most facile manner. It is also to be observed that device D comprises a simplicity of parts which are extremely durable in operation and hence wear-resistant.

It should be understood that in addition to a visual signal, as provided for by lamp 30, an audio signal may be easily incorporated within the circuit. Additionally, the device of the present invention is readily operative with vehicles having magneto ignition without requiring any modifications by those well understood in the art.

Having thus described our invention, what we claim and desire to obtain Letters Patent for is:

1. A gravity actuated safety switch for use with apparatus subject to tiltable movement during operation in order to prevent attainment of a predetermined angle of tilt and having a source of electrical power, means operated by said electrical power, and means connecting said means operated by said electrical power and said source of electrical power, said safety device comprising a first conductive, pendulum-like element, a second conductive element, said first and second conductive elements being relatively movable toward each other in contact-making, circuit-closing relationship under influence of gravity, means connecting said second conductive element to said source of electrical power, a switch member interposed between, and connected to, said first conductive element and said apparatus means operated by said source of electrical power, said switch member having normally closed contacts for completion of circuitry between said electrical power source and said apparatus means operated thereby, said switch member also having normally open first and second contacts, means for effecting closure of said switch member first and second normally open contacts after a predetermined interval of continuous contact-making relationship of said first and second conductive elements, whereby said means connecting said electrical power source and said apparatus means operated thereby are disconnected with attendant discontinuance of operation of said apparatus while said first and second normally open contacts are closed.

2. A gravity actuated safety switch as defined in claim 1 and further characterized by said means for effecting closure of said switch member first and second normally open contacts being a thermally controlled relay of the thermal type having a heater coil.

3. A gravity actuated safety switch as defined in claim 1 and further characterized by said second conductive element having an opening of continuous curvilinear configuration being marginally unbroken, said first conductive element being a pendulum, means for suspending said pendulum upwardly of said second conductive opening presenting said pendulum in normal, axially perpendicular relationship to the plane of said opening and being of such length for contact-making relationship with the edge of said opening under influence of gravity.

4. A gravity actuated safety switch as defined in claim 3 and further characterized by means for mounting said second conductive element upon said apparatus for normal planar parallel relationship with the horizontal.

5. A gravity actuated safety switch as defined in claim 4 and further characterized by the opening in said second conductive element having its major axis lengthwise of the device, and visual signal means connected to said switch member.

6. A gravity actuated safety switch for use with apparatus subject to tiltable movement during operation and having a source of electrical power and means operated by said electrical power, said safety device comprising a first conductive element, a second conductive element, said first and second conductive elements being relatively movable toward each other into contact-making relationship under influence of gravity, a first switch member connected to said first conductive element, a second switch member connected to said second conductive element, means effecting closure of said first switch member after a predetermined time interval subsequent to continuous contactmaking of said first and second conductive elements, said first switch member being connected to said apparatus means operated by said electrical power causing discontinuance of operation of the same upon closure of said first switch member, and control means for optionally connecting or disconnecting said second conductive element with or from, respectively, said apparatus source of electrical power.

7. A gravity actuated safety switch as defined in claim 6 and further characterized by said first and second switch members being relays and each having normally open first and second contacts, said means for effecting closure of said first switch member being a first thermal component for closing said first switch, first and second contacts upon attainment of a predetermined temperature, another thermal component provided in said second switch member causing closure of said second switch first and second contacts upon attainment of a predetermined temperature.

8. A gravity actuated safety switch as defined in claim 7 and further characterized by said first switch first thermal component and said second switch other thermal component being actuated at different temperatures whereby a differential in time intervals before closure of the first switch first and second contacts and said second switch first and second contacts is occasioned.

9. A gravity actuated safety switch as defined in claim 8 and further characterized by the first thermal component adapted to effect closure of the related first and second contacts after an interval of approximately two seconds, and said second thermal component being adapted to effect closure of the related first and second contacts after an interval of approximately two minutes.

10. A gravity actuated safety switch as defined in claim 6 and further characterized by said control means being a switch body having two positions, in the first of said positions said switch body interconnects the second conductive element, the source of electrical power and said second switch member, in the second of said positions, said switch body connects said source of electrical power and said second switch member, there being a connection between said second switch member and said second conductive element when said switch body is in its second position so that upon closure of said second switch member a circuit may be closed through said first and second conductive elements to said first switch member.

* * * * *